(12) United States Patent
Schantz et al.

(10) Patent No.: US 8,002,140 B2
(45) Date of Patent: Aug. 23, 2011

(54) BABY BOWL

(75) Inventors: Barbara McNew Schantz, Huntsville, AL (US); Hans Gregory Schantz, Huntsville, AL (US); Patrick Allan McNew, Glencoe, AL (US)

(73) Assignee: Baby Dipper LLC, Hampton Cove, AL (US)

( * ) Notice: Subject to any disclaimer, the term of this patent is extended or adjusted under 35 U.S.C. 154(b) by 0 days.

(21) Appl. No.: 12/647,842

(22) Filed: Dec. 28, 2009

(65) Prior Publication Data

US 2010/0096391 A1 Apr. 22, 2010

Related U.S. Application Data

(63) Continuation of application No. 11/505,547, filed on Aug. 17, 2006, now Pat. No. 7,637,388.

(60) Provisional application No. 60/709,297, filed on Aug. 18, 2005.

(51) Int. Cl.
*A47G 19/02* (2006.01)
(52) U.S. Cl. .............. 220/574.1; 220/574; 220/628; 220/630; 220/636
(58) Field of Classification Search .......... 220/574, 220/574.1, 628, 630, 632, 636
See application file for complete search history.

(56) References Cited

U.S. PATENT DOCUMENTS

| 766,427 | A | * | 8/1904 | Crowell | 220/575 |
| 2,329,279 | A | * | 9/1943 | Lower | 220/574.2 |
| 4,388,996 | A | * | 6/1983 | Panicci | 220/603 |
| 4,986,434 | A | * | 1/1991 | Prestyly, Jr. | 220/574 |
| 5,172,826 | A | * | 12/1992 | Celaya | 220/574 |
| 5,474,206 | A | * | 12/1995 | Herring, Sr. | 220/636 |
| 5,542,565 | A | * | 8/1996 | Hidalgo-Lopez | 220/574.1 |
| 5,638,981 | A | * | 6/1997 | Crane et al. | 220/574.1 |
| 5,641,140 | A | * | 6/1997 | Sorenson | 248/205.3 |
| 6,230,653 | B1 | * | 5/2001 | Tobin | 119/72 |
| 6,305,656 | B1 | * | 10/2001 | Wemyss | 248/309.4 |
| 6,516,747 | B1 | * | 2/2003 | Willinger | 119/61.54 |
| 7,637,388 | B2 | * | 12/2009 | Schantz et al. | 220/574.1 |

* cited by examiner

*Primary Examiner* — Anthony Stashick
*Assistant Examiner* — Madison L Wright
(74) *Attorney, Agent, or Firm* — James Richards

(57) ABSTRACT

A bowl includes non-slip means and spoon-assisted food conglomeration means. In a preferred embodiment, the bowl is transparent. Non-slip means may include a weight structure, a non-slip material affixed to the bowl bottom either substantially continuously covering the bottom or substantially discontinuously covering the bottom. Spoon-assisted food conglomeration means may include a sloped bottom, a substantially spoon-shaped locus, a steep rim, or an inward-curving rim. The bowl may further include spillage reduction means. Spillage reduction means may include an abrupt taper terminus, a steep rim, an inward-curving rim, or a chamfered or rounded bowl vertex. Alternatively the bowl may comprise a sloped bottom terminating in a substantially spoon-shaped locus and further comprise non-slip means. In alternate embodiments the bowl may further comprise spillage reduction means or be characterized by a substantial transparent region.

22 Claims, 3 Drawing Sheets

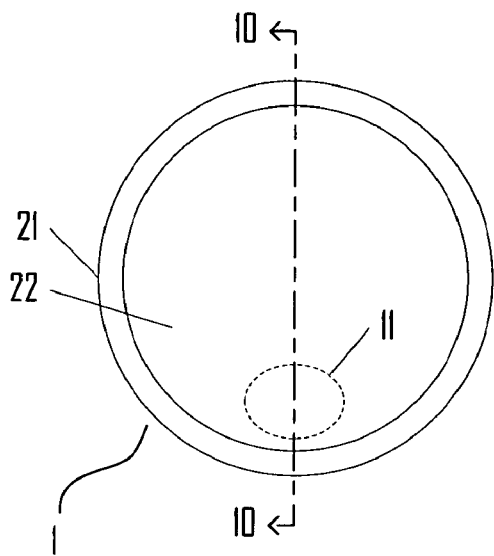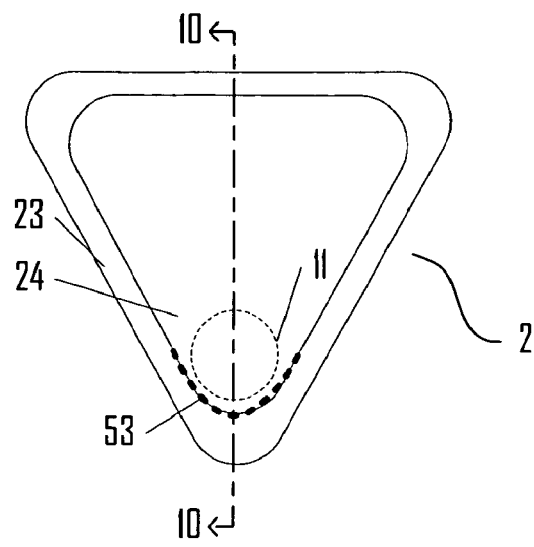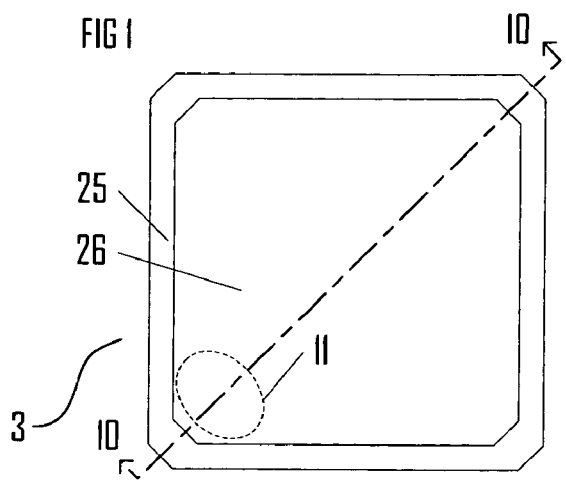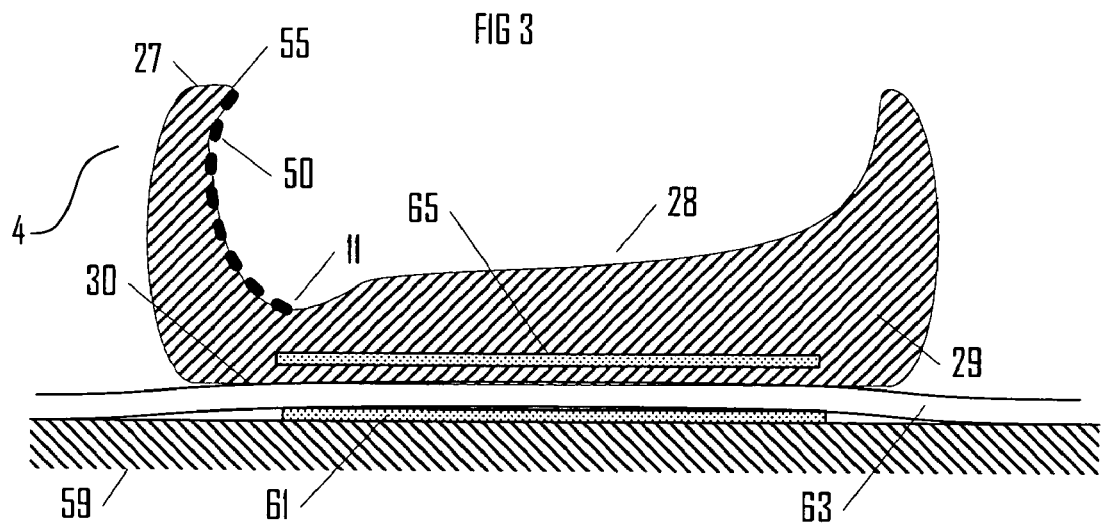

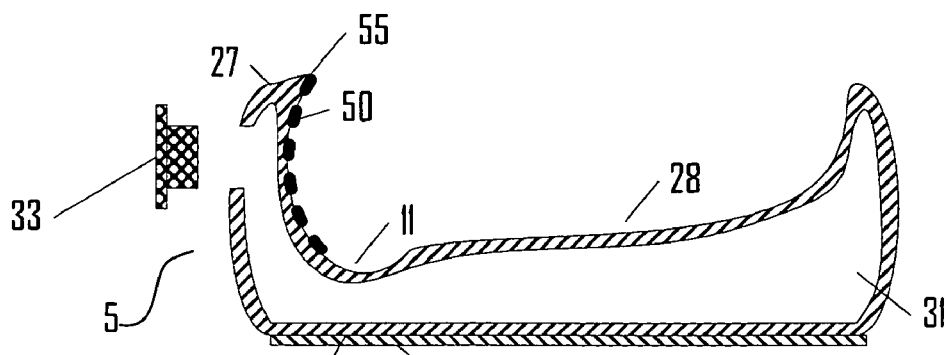
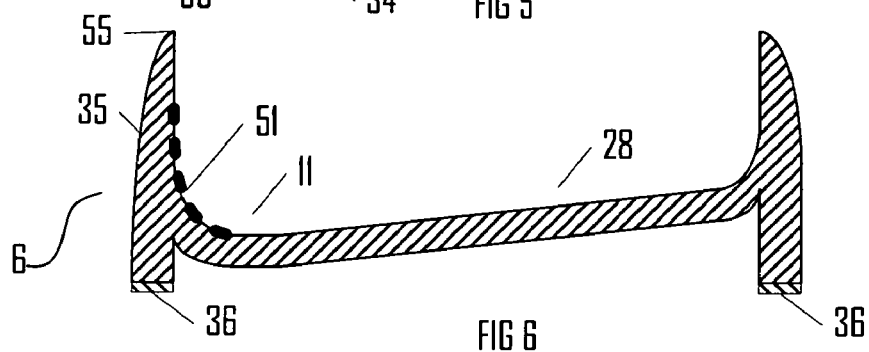
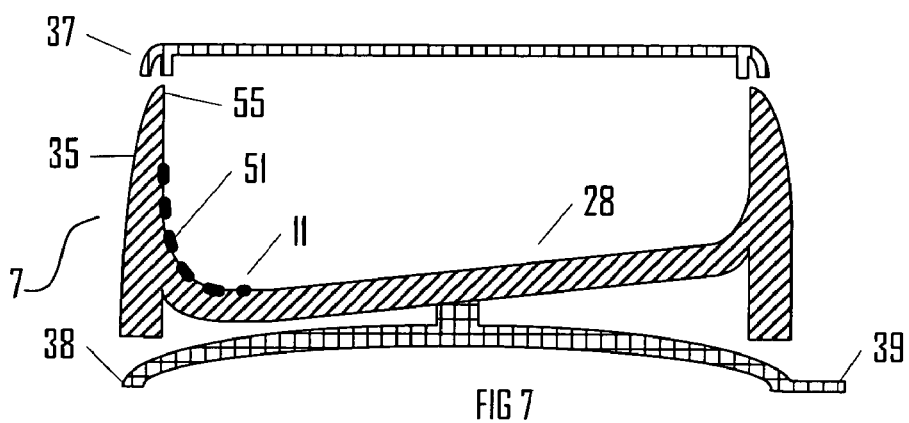
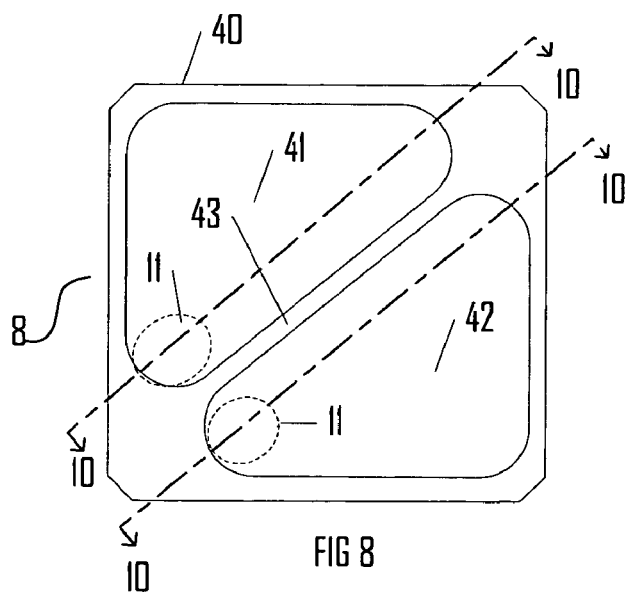

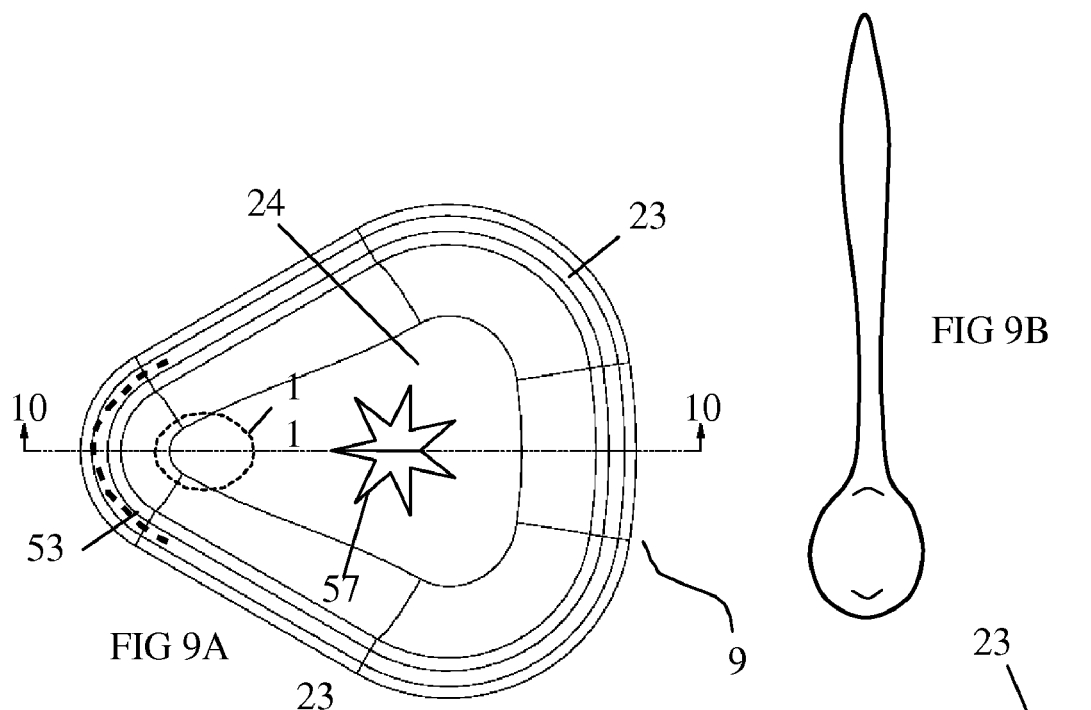
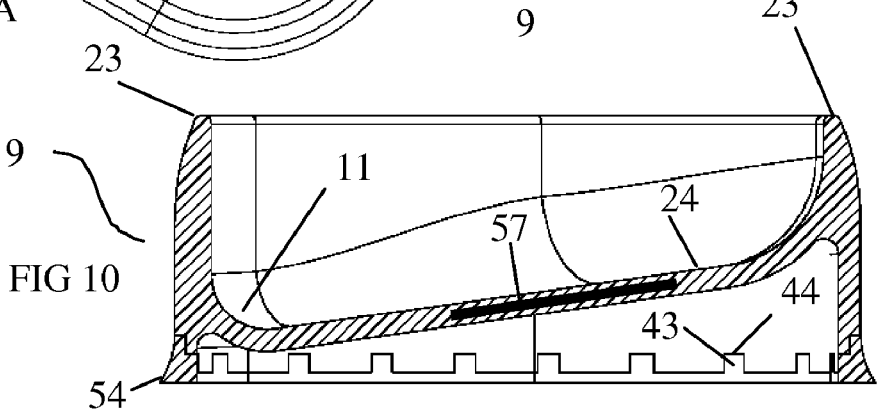
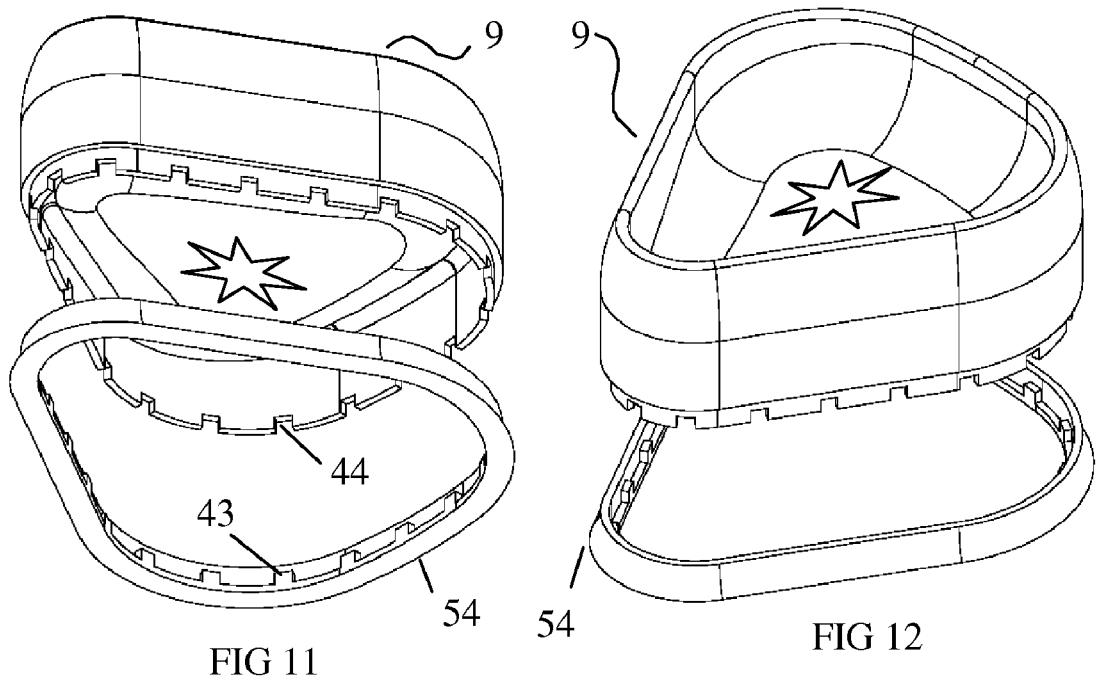

BABY BOWL

This application is a continuation of U.S. patent application Ser. No. 11/505,547, titled "Baby Bowl," filed Aug. 17, 2006 now U.S. Pat. No. 7,637,388, by Schantz et al, which claims benefit of prior-filed Provisional Patent Application Ser. No. 60/709,297 filed Aug. 18, 2005 which is incorporated herein by reference.

BACKGROUND OF THE INVENTION

1. Field of the Invention

The present invention is directed to bowls for use in feeding infants or others incapable of feeding themselves, and especially to improved bowls for this use. The present invention is further directed toward bowls for self-feeding infants and others whose lack of coordination or dexterity make self-feeding difficult.

2. Prior Art

Infant feeding is challenging for both infant and caregiver in many ways. Young infants require a caregiver to feed the infant. Using conventional baby bowls, feeding an infant is a two-handed job: one hand to hold a spoon or other feeding utensil, and the other hand to keep the baby bowl from sliding around the typically smooth surface of a table or high chair tray. Even a baby bowl with a suction cup or other means to prevent slippage will typically require a caregiver to detach, pick up, and hold the bowl in one hand to scrape the bottom of the bowl clean so as to capture the last bite of often expensive, specially-prepared baby food. A caregiver has many demands on their attention while feeding an infant. These demands include, but are not limited to, cleaning up after, controlling, or caressing an infant. Because a caregiver feeding an infant generally lacks a free hand, their ability to meet the infant's needs is significantly impaired. A caregiver feeding multiple infants faces even greater challenges because there are still further demands on the caregiver's attention. If the caregiver lacks a free hand to deal with these demands, the care delivered will be lackluster and both infant and caregiver will experience frustration.

Infant feeding is even more challenging for a self-feeding infant. An infant often lacks the dexterity to systematically scrape the bottom of the bowl to capture the last spoonful. In addition, an infant lacks the coordination to avoid using excessive force that might cause the bowl to slide along a smooth surface. Further, an infant is prone to dribble, drip, or spill food from the bottom of a spoon that has not been properly scraped. Finally, an infant needs all the sensory cues available to coordinate properly maneuvering a utensil to pick up food. The opaque walls of typical bowls are prone to block an infant's view.

In view of the foregoing, there is a great need for the bowl that allows for easy collection of food into a last spoonful. There is also a need for the bowl with a means for preventing slippage or spillage. There is a further need for a transparent bowl that allows an infant to better perceive the location of a spoon even when it would otherwise be occluded by part of the bowl.

BRIEF SUMMARY OF THE INVENTION

Briefly, the present invention relates to a transparent bowl including non-slip means and spoon-assisted food conglomeration means. Non-slip means may include a weight structure, a non-slip material affixed to the bowl bottom either substantially continuously covering the bottom or substantially discontinuously covering the bottom, using magnetic materials, or a suction cup. Spoon-assisted food conglomeration means may include a sloped bottom, a substantially spoon-shaped locus, a steep rim, or an inward-curving rim. The transparent bowl may further include an embedded decorative object or spillage reduction means. Spillage reduction means may include an abrupt taper terminus, a steep rim, an inward-curving rim, or a chamfered or rounded bowl vertex. The transparent bowl may further include a lid.

Alternatively the bowl may comprise a sloped bottom terminating in a substantially spoon-shaped locus and further comprise non-slip means. In alternate embodiments the bowl may further comprise spillage reduction means or be characterized by a substantial transparent region. A substantial transparent region may further include one or more embedded decorative objects.

In still further embodiments, the bowl may comprise non-slip means, spoon-assisted food conglomeration means, and spillage reduction means.

It is, therefore, a feature of the present invention to provide spoon-assisted food conglomeration means allowing and enabling the last few spoonfuls of material in a baby bowl to be easily and efficiently collected. It is a further feature of the present invention to provide non-slip means allowing and enabling a caregiver to use only one hand to feed a baby, freeing a caretaker from having to hold the bowl in one hand and a spoon or other feeding utensil in another hand. Another embodiment of the present invention is to provide a transparent bowl thus allowing an inexperienced self-feeder a better view of the feeding process. A still further embodiment of the present invention is to provide spillage prevention means to minimize messiness and the need for cleaning up at mealtimes.

Yet another aspect of the present invention is to enable a caretaker to more efficiently feed more than one infant simultaneously. An additional aspect of the present invention is to provide a more fulfilling, and nurturing relationship between an infant and a caregiver by enabling a caregiver to feed an infant with one hand, freeing the other hand to clean up after, control, or caress an infant.

Further objects, features, and aspects of the present invention will be apparent from the following specification and claims when considered in connection with the accompanying drawings. Like elements are labeled using like reference numerals in the various figures, illustrating the preferred and alternate embodiments of the invention.

BRIEF DESCRIPTION OF THE DRAWINGS

FIG. 1 is a top view of a circular bowl in accordance with the present invention.

FIG. 2 is a top view of a triangular bowl in accordance with the present invention.

FIG. 3 is a top view of a square bowl in accordance with the present invention.

FIG. 4 is a first alternate cross-section of the bowl, showing a solid fill and using magnetic materials as non-slip means.

FIG. 5 is a second alternate cross-section of the bowl showing a hollow interior.

FIG. 6 is a third alternate cross-section of the bowl showing an open underside.

FIG. 7 is a fourth alternate cross-section of the bowl showing a lid.

FIG. 8 is a diagram of a dual bowl.

FIG. 9A is a diagram of a preferred embodiment bowl.

FIG. 9B is an exemplary spoon in accordance with the present invention.

FIG. 10 is a cross-section of the preferred embodiment bowl.

FIG. 11 is a bottom perspective isometric exploded view of the preferred embodiment bowl.

FIG. 12 is a top perspective isometric exploded view of the preferred embodiment bowl.

DETAILED DESCRIPTION OF THE INVENTION

This section discusses a variety of bowls according to the teachings of the present invention. FIG. 1 is a top view of a circular bowl 1 in accordance with the present invention. The circular bowl 1 comprises a circular rim 21 and a circular sloped surface 22. A cross-section axis 10 is a convenient axis on which to examine structural details of the circular bowl 1.

The circular sloped surface 22 terminates in a spoon-shaped locus 11. The spoon-shaped locus 11 is a minimum in the circular sloped surface 22 and has a shape and size substantially similar to that of a spoon. The spoon-shaped locus 11 is a depression that acts to help collect food in conjunction with not only the normal functioning of weight and gravitation, but also in conjunction with typical spoon use by an infant, caregiver or other person using the circular bowl 1. Natural feeding motion, drawing a spoon in strokes toward the spoon-shaped locus 11, will tend to accumulate, concentrate and collect food in the spoon-shaped locus 11.

When very little food remains in the circular bowl 1, the circular sloped surface 22, the circular rim 21, and the spoon-shaped locus 11 tend to cooperate to collect food in the spoon-shaped locus 11 allowing the last bite of food to be efficiently collected in a single spoonful. The circular rim 21, the circular sloped surface 22, and the spoon-shaped locus 11 thus cooperate to form a spoon-assisted food conglomeration means.

Spoon-assisted food conglomeration means are means by which the bowl aids in the collection, accumulation, or gathering of food in conjunction with the functioning of a spoon or other feeding utensil. Means for spoon-assisted food conglomeration may include but are not necessarily limited to sloped bottoms, spoon-shaped minima, spoon-shaped depressions, or spoon-shaped loci, steep rims, and inwardly tapered rims.

FIG. 2 is a top view of a triangular bowl 2 in accordance with the present invention. The triangular bowl 2 comprises a triangular rim 23 and a triangular sloped surface 24. The triangular sloped surface 24 terminates in the spoon-shaped locus 11. The triangular rim 23, the triangular sloped surface 24, and the spoon-shaped locus 11 cooperate to form spoon-assisted food conglomeration means. The cross-section axis 10 is a convenient axis on which to examine structural details of the triangular bowl 2. The triangular rim 23 features a chamfered vertex 53. The chamfered vertex 53 serves to scrape the bottom of a spoon, thus avoiding spillage. In alternate embodiments a contour of the chamfered vertex 53 may be designed to substantially coordinate with a contour of an associated spoon, just as a shape of a spoon-shaped locus may be designed to correspond to a shape of an associated, complementary, or corresponding spoon.

FIG. 3 is a top view of a square bowl 3 in accordance with the present invention. The square bowl 3 comprises a square rim 25 and a square sloped surface 26. The square sloped surface 26 terminates in the spoon-shaped locus 11. The square rim 25 is chamfered or rounded for two purposes: first to avoid a sharp corner that might be difficult to clean or difficult from which to extract food during feeding and second to enable scraping of the bottom of a spoon thus limiting spillage. The square rim 25, the square sloped surface 26, and the spoon-shaped locus 11 cooperate to form spoon-assisted food conglomeration means. The cross-section axis 10 is a convenient axis on which to examine structural details of the square bowl 3.

A bowl, according to the teachings of the present invention, may be circular (as in the circular bowl 1), triangular (as in the triangular bowl 2), square (as in the square bowl 3), or any other shape suitable for the use and function of a bowl. One familiar with bowls will realize that there are a great many alternately shaped bowls possible that could incorporate the teachings of the present invention. For instance, although the circular bowl 1 is shown as substantially circular, nothing in the teachings of the present invention should be construed so as to preclude oval, elliptical, or other variations similar in spirit to the circular bowl 1.

Bowl Cross Sections

This section discusses a variety of bowl cross-sections according to the teachings of the present invention. FIG. 4 is a first alternate cross-section 4 of the bowl, showing a solid fill and using magnetic materials as non-slip means. The first alternate cross-section 4 generally depicts potential interior structure along the cross-section axis 10. The first alternate cross-section 4 comprises a rim 27, a sloped surface 28, the spoon-shaped locus 11, a bottom 30, and an interior 29.

Inward curve 50 of rim 27, sloped surface 28, and spoon-shaped locus 11 cooperate to form spoon-assisted food conglomeration means. Interior 29 is solid to add additional weight and thus form a weight structure. A weight structure is an example of non-slip means. Interior 29 may be the same composition as rim 27, sloped surface 28, spoon-shaped locus 11, or bottom 30, or interior 29 may comprise alternate high density material for added weight. High density material may be incorporated in interior 29, bottom 30, or elsewhere to form a weight structure, increase weight and friction, and thus serve as a non-slip means. Interior 29 and bottom 30 cooperate to form non-slip means. The weight of interior 29 increases the normal force on bottom 30, thus increasing the friction force and reducing the likelihood of slippage or movement during feeding.

The first alternate cross-section 4 further comprises a table 59, a table cover 63, a magnetic sheet 61, and an embedded magnetic media 65. The table 59 may be a high chair tray, counter, or other surface on which the bowl may rest. The table cover 63 is typically a removable, washable top, such as is often found on high chair trays. In alternate embodiments, the table cover 63 may be a place mat or tablecloth or may not be present. The magnetic sheet 61 is typically a thin permanent magnet. The magnetic sheet 61 may be directly affixed to the table 59 (for instance, by glue, epoxy, or other adhesive). The magnetic sheet 61 is capable of exerting a significant force on the embedded magnetic media 65. This force acts to increase the normal force on the bottom 30, thus increasing the friction force and reducing the likelihood of slippage or movement during feeding. In addition, the attraction between the magnetic sheet 61, and the embedded magnetic media 65 will also exert a restraining force to resist lateral movement again reducing the likelihood of slippage or movement during feeding. The magnetic sheet 61, and the embedded magnetic media 65 thus cooperate to form non-slip means.

The embedded magnetic media 65 may be a ferromagnetic media attracted by the magnetic sheet 61. In further embodiments, the bowl may employ a substantial amount of ferromagnetic material in lieu of the embedded magnetic media 65. In another embodiment, the embedded magnetic media 65 may be a permanent magnetic media capable of attracting the magnetic sheet 61 even if the magnetic sheet 61 is not a permanent magnet. In still further embodiments, the table 59 may be constructed of a ferromagnetic material so the embedded magnetic media 65 may be used without need of the magnetic sheet 61. One skilled in the magnetic arts will realize that there are a great many other additional ways beyond those described here to use magnetic materials and magnetic attraction as non-slip means.

Non-slip means are means by which friction is increased between the bowl and a supporting table, high chair tray, or other surface so as to reduce the likelihood of undesired slippage, sliding, or movement during feeding. Non-slip means may include but are not limited to a weight structure or weighting of a bowl, high friction or non-slip material added to the bottom of the bowl in pads, strips, layers, films, or other placement, using a high-friction coefficient material in the bowl so as to yield a high-friction bottom (such as the bottom 30), using magnetic materials, or even using a suction cup.

FIG. 5 is a second alternate cross-section 5 of the bowl, showing a hollow interior 31. The second alternate cross-section 5 generally depicts potential interior structure along the cross-section axis 10. The second alternate cross-section 5 comprises the rim 27, the sloped surface 28, the spoon-shaped locus 11, the bottom 30, a non-slip material 34, the hollow interior 31, and a removable plug 33. An inward curve 50 of the rim 27, the sloped surface 28, and the spoon-shaped locus 11 cooperate to form spoon-assisted food conglomeration means. The inward curve 50 terminates in an abrupt taper terminus 55 to assist in scraping food from the bottom of a spoon.

The removable plug 33 allows access to the hollow interior 31 and provides a means by which hot or cold gels or fluids may be introduced to the hollow interior 31 for the purpose of regulating the temperature of food in the bowl. In alternate embodiments, the hollow interior 31 may be filled with an appropriate gel or fluid medium and permanently sealed. In such an embodiment the bowl may be either heated or chilled and will maintain temperature of food in the bowl.

In alternate embodiments, a non-slip material, such as the non-slip material 34, may be affixed to the bottom 30. The non-slip material 34 may be an adhesive rubber pad, neoprene, or other high friction surface. A non-slip material may provide a substantially continuous covering of the bottom 30, as with the non-slip material 34, or may be applied over smaller or substantially discontinuous areas of the bottom 30.

FIG. 6 is a third alternate cross-section 6 of the bowl, showing an open underside. The third alternate cross-section 6 generally depicts potential interior structure along the cross-section axis 10. The third alternate cross-section 6 comprises a rim 35, the sloped surface 28, the spoon-shaped locus 11, and an optional non-slip material 36. The rim 35, the sloped surface 28, and the spoon-shaped locus 11 cooperate to form spoon-assisted food conglomeration means. The optional non-slip material 36 may be substantially continuous around the rim 35 or substantially discontinuous pads or other distributions around the rim 35. The rim 35 is steep, with a contour 51 closely approaching vertical. The steep rim 35 also has an abrupt taper terminus 55. The steep rim 35 and the abrupt taper terminus 55 cooperate to form spillage reduction means.

Spillage reduction means are means by which the bowl tends to prevent spills by keeping, corralling, or retaining food in a bowl. A steep rim, like the steep rim 35, tends to prevent spills by making it more difficult for uncoordinated self-feeders to create spills by pushing or pulling food up and over the rim. A rim with an inward curve, like the inward curve 50, also tends to make it more difficult for self-feeders to create spills by pushing food up and over the rim. Food dripping from the bottom of a spoon is also a significant spillage modality. An abrupt taper terminus, like the abrupt taper terminus 55, tends to scrape or remove food from the bottom of a spoon, minimizing this spillage. A chamfered or rounded bowl vertex, like the chamfered vertex 53 also tends to scrape or remove food from the bottom of a spoon. Spillage reduction means include, but are not limited to, steep rims, inward-curving rims, abrupt taper termini, and chamfered or rounded vertices.

FIG. 7 is a fourth alternate cross-section 7 of the bowl, showing a lid 37 and a suction cup 38. The fourth alternate cross-section 7 generally depicts potential interior structure along the cross-section axis 10. The fourth alternate cross-section 7 comprises the rim 35, the sloped surface 28, the spoon-shaped locus 11, the lid 37, the suction cup 38 and a suction cup tab 39. The rim 35, the sloped surface 28, and the spoon-shaped locus 11 cooperate to form spoon-assisted food conglomeration means. The suction cup 38 acts to secure the bowl to a surface and forms non-slip means. The suction cup tab 39 allows for easily removal of the suction cup 38. The lid 38 allows food to be better preserved, stored, or transported in the bowl.

A Dual Bowl

FIG. 8 is a diagram of a dual bowl 8. The dual bowl 8 comprises an exterior rim 40, a diagonal rim 43, a first sloped surface 41, and a second sloped surface 42. The dual bowl 8 exhibits substantially similar cross-section structure along the axes 10 through the spoon shaped loci 11. The diagonal rim 43 partitions the first sloped surface 41 and the second sloped surface 42 allowing the dual bowl 8 to store two separate servings of food. Further, the dual bowl 8 is ideal for storing identical servings of food for feeding twins including, but not limited to Greta and Cora Schantz. Alternatively the dual bowl 8 can store servings of two different foods. In still further alternate embodiments, the bowl may include a plurality of sloped eating surfaces with spoon shaped loci for storing three, four, or more separate servings.

The axes 10 are co-aligned so that a right-handed person can spoon naturally from a far or upper right corner to a near or lower left corner. Similarly, a left-handed person can rotate preferred embodiment 90 degrees counter-clockwise relative to the depiction of preferred embodiment 8 in FIG. 8. In this orientation, a left-handed person can spoon naturally from a far or upper left corner to a near or lower right corner. Terms like far or upper right, near or lower right, far or upper left, and near or lower left are used solely for purposes of explanation and illustration and not for purpose of limitation.

DETAILED DESCRIPTION OF THE PREFERRED EMBODIMENT

FIG. 9A is a diagram of a preferred embodiment bowl 9. The preferred embodiment bowl 9 comprises the triangular rim 23 and the triangular sloped surface 24. The triangular sloped surface 24 terminates in the substantially spoon-shaped locus 11. The triangular rim 23 is also characterized by the chamfered vertex 53. The triangular rim 23 and the triangular sloped surface 24 cooperate to form a recess for receiving food.

The preferred embodiment bowl 9 is preferably transparent. Novice self-feeders can benefit from a variety of sensory cues including visual cues. The transparency of the preferred embodiment bowl 9 allows novice self-feeders to see through the bowl so as to better understand the location and orientation of a spoon relative to the preferred embodiment bowl 9 and food it contains. The preferred embodiment bowl 9 may be entirely transparent or may be transparent only for some substantial region.

The preferred embodiment bowl 9 may further include embedded decorative objects, like the embedded decorative object 57. Although the embedded decorative object 57 is shown as a seven-pointed star or septagram, the embedded decorative object 57 may be any of a wide variety of embedded decorative objects. The embedded decorative object 57 may be a trademark, images of cartoon or other characters, decorative designs, sparkles, small 3-D items, or any other object embedded for aesthetic, commercial, promotional, entertainment, or developmental reasons. In particular alternate embodiments, the embedded decorative object 57 may be embedded underneath the spoon shaped depression 11 so as to provide young self-feeders with positive visual feedback upon cleaning out the bowl. In still further embodiments, the embedded decorative object 57 may be embedded in the triangular rim 23.

FIG. 10 is a cross-section of the preferred embodiment bowl 9 along the cross-section axis 10. The preferred embodiment bowl 9 includes a co-molded non-slip ring 54. The co-molded non-slip ring 54 is characterized by a plurality of tenon-like projections 43 that fit with a matching plurality of mortise-like cavities 44 so as to provide additional mechanical stability.

FIG. 11 is a bottom perspective isometric exploded view of the preferred embodiment bowl 9. The plurality of tenon-like projections 43 on co-molded non-slip ring 54 mate into the plurality of mortise-like cavities 44 so as to provide additional mechanical stability. In alternate embodiments, the co-molded non-slip ring 54 may be characterized by a plurality of plurality of mortise-like cavities that mate into tenon-like projections.

FIG. 12 is a top perspective isometric exploded view of the preferred embodiment bowl 9.

Although the teachings of the present invention apply particularly well to bowls for feeding infants and to bowls for use by self-feeding infants, the scope of the present invention includes many other applications. The present invention may be useful for feeding more mature children or adults who are incapable of feeding themselves. The present invention may be useful for more mature children or adults whose mobility, coordination, or dexterity are impaired.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A feeding system for use with an infant or a person needing assistance or for promoting the self feeding of a baby or other person with limited self feeding ability, said feeding system comprising:

a bowl (2), said bowl having a recess for receiving food, said recess surrounded by at least one rim (23);

said bowl having a sloped surface (28) forming a bottom of said recess, said sloped surface having a general slope downward toward a locus (11) for spoon assisted conglomeration of said food, said locus (11) transitioning to and proximal to said rim (23), said locus (11) forming a lowest portion of said recess for receiving said food;

said rim (23) terminating at the top of said bowl in an abrupt taper terminus (55); said abrupt taper terminus for facilitating the loading of a spoon with said food and for scraping drippings from said food from the bottom of said spoon to reduce spillage;

said rim (23) converging to a chamfered or rounded interior vertex (53) proximal to and conformal to said locus (11); said interior vertex (53) having a curvature for use with a corresponding curvature of said spoon;

said vertex (53) having a steep slope adjacent to and transitioning to said locus (11); said steep slope having a smooth and continuous incline for allowing said spoon continuous uninterrupted sliding contact with said rim (23) as said spoon is lifted from said locus (11) to the top of said rim (23) for loading food on said spoon; and said bowl having a non-slip (35) surface on an underside bottom (30) of said bowl (2); wherein a portion of said underside bottom of said bowl for contacting a supporting surface extends laterally beyond a maximum lateral extent of said recess for receiving food.

2. The feeding system as recited in claim 1, wherein said abrupt taper terminus comprises an inside corner between a surface of said rim sloping downward into the bowl recess and a surface of said rim (23) at the top of said rim.

3. The feeding system as recited in claim 2, wherein said abrupt taper terminus forms a right angle at said inside corner.

4. The feeding system as recited in claim 2, wherein said abrupt taper terminus forms an acute angle at said inside corner.

5. The feeding system as recited in claim 2, wherein said abrupt taper terminus includes a surface sloping downward toward an outside of the bowl.

6. The feeding system as recited in claim 2, wherein said abrupt taper terminus includes a flat top surface of the rim of said bowl.

7. The feeding system as recited in claim 1, wherein said abrupt taper terminus is formed using a single radius to join an inside slope of said rim to an outside slope of said rim by a single radius curve as viewed in cross section through a thickness of said rim.

8. The feeding system as recited in claim 1, wherein said locus (11) transitions from a continuous extension of said general slope of said sloped surface (28).

9. The feeding system as recited in claim 8, wherein said rim (23) includes a transparent portion sufficiently transparent for viewing said food in said bowl.

10. The feeding system as recited in claim 1, wherein said non-slip surface forms a ring around an outer perimeter of said underside bottom.

11. The feeding system as recited in claim 10, wherein said abrupt taper terminus includes a flat top surface of the rim of said bowl.

12. The feeding system as recited in claim 1, wherein said locus (11) forms a deeper depression than would be formed by an extension of said general slope of said sloped surface (28) to said locus (11).

13. The feeding system as recited in claim 12, wherein said depression is substantially spoon shaped.

14. The feeding system as recited in claim 13, wherein said rim (23) includes a transparent portion sufficiently transparent for viewing said food in said bowl.

15. The feeding system as recited in claim 1 wherein said rim (23) is inwardly curving (50) at the top of said rim (23) such that the rim does not overhang the bowl at a deepest portion of the recess.

16. The feeding system as recited in claim 1, wherein said non-slip surface comprises a suction cup (22).

17. The feeding system as recited in claim 16, wherein said suction cup (38) is attached with a detachable coupling (38), allowing said bowl to be detached from said suction cup during a feeding session.

18. The feeding system as recited in claim 1, wherein said bowl (2) includes a magnetic material (65) for improving non-slip properties of said bowl.

19. The feeding system as recited in claim 1, wherein said bowl (2) includes a weight structure (65) for improving non-slip properties of said bowl.

20. The feeding system as recited in claim 1, further including a weight structure.

21. The feeding system as recited in claim 1, wherein the steep slope includes a vertical portion.

22. A feeding system for use with an infant or a person needing assistance or for promoting the self feeding of a baby or other person with limited self feeding ability, said feeding system comprising:
   a spoon, and
   a bowl (2), said bowl having a recess for receiving food, said recess surrounded by at least one rim (23);
   said bowl having a sloped surface (28) forming a bottom of said recess, said sloped surface having a general slope downward toward a locus (11) for spoon assisted conglomeration of said food, said locus (11) transitioning to and proximal to said rim (23), said locus (11) forming a lowest portion of said recess for receiving said food;
   said rim (23) terminating at the top of said bowl in an abrupt taper terminus (55); said abrupt taper terminus for facilitating the loading of said spoon with said food and for scraping drippings from said food from the bottom of said spoon to reduce spillage;
   said rim (23) converging to a chamfered or rounded interior vertex (53) proximal to and conformal to said locus (11); said interior vertex (53) having a curvature for use with a corresponding curvature of said spoon; said spoon having a curvature corresponding to said curvature of said interior vertex;
   said vertex (53) having a steep slope adjacent to and transitioning to said locus (11); said steep slope having a smooth and continuous incline for allowing said spoon continuous uninterrupted sliding contact with said rim (23) as said spoon is lifted from said locus (11) to the top of said rim (23) for loading food on said spoon; and
   said bowl having a non-slip (35) surface on an underside bottom (30) of said bowl (2); wherein a portion of said underside bottom of said bowl for contacting a supporting surface extends laterally beyond a maximum lateral extent of said recess for receiving food.

* * * * *